United States Patent
Hidaka et al.

(10) Patent No.: US 11,554,342 B2
(45) Date of Patent: Jan. 17, 2023

(54) FILTER

(71) Applicants: TOYOBO CO., LTD., Osaka (JP); TOYOTA BOSHOKU KABUSHIKI KAISHA, Kariya (JP)

(72) Inventors: Yusuke Hidaka, Otsu (JP); Keiko Sakaguchi, Otsu (JP); Takuya Nakazawa, Otsu (JP); Kimiko Yoshida, Kariya (JP); Jun Goto, Kariya (JP)

(73) Assignees: TOYOBO CO., LTD., Osaka (JP); TOYOTA BOSHOKU KABUSHIKI KAISHA, Kariya (JP)

( * ) Notice: Subject to any disclaimer, the term of this patent is extended or adjusted under 35 U.S.C. 154(b) by 291 days.

(21) Appl. No.: 16/760,705

(22) PCT Filed: Oct. 29, 2018

(86) PCT No.: PCT/JP2018/040064
§ 371 (c)(1),
(2) Date: Apr. 30, 2020

(87) PCT Pub. No.: WO2019/093173
PCT Pub. Date: May 16, 2019

(65) Prior Publication Data
US 2021/0178313 A1 Jun. 17, 2021

(30) Foreign Application Priority Data
Nov. 10, 2017 (JP) .............................. JP2017-217558

(51) Int. Cl.
| | | |
|---|---|---|
| *B01D 53/02* | (2006.01) | |
| *B01D 53/04* | (2006.01) | |
| *B01J 20/06* | (2006.01) | |
| *B01J 20/20* | (2006.01) | |
| *B01J 20/26* | (2006.01) | |
| *B01J 20/32* | (2006.01) | |

(52) U.S. Cl.
CPC .............. *B01D 53/04* (2013.01); *B01J 20/06* (2013.01); *B01J 20/20* (2013.01); *B01J 20/26* (2013.01); *B01J 20/3204* (2013.01); *B01J 20/3291* (2013.01); *B01D 2253/25* (2013.01); *B01D 2253/3425* (2013.01)

(58) Field of Classification Search
CPC ...... B01D 2253/102; B01D 2253/1122; B01D 2253/1124; B01D 2253/202; B01D 2253/25; B01D 2253/3425; B01D 2257/302; B01D 2257/304; B01D 2257/404; B01D 53/02; B01D 53/04; B01D 53/508; B01D 53/565; B01D 53/82; B01J 20/041; B01J 20/043; B01J 20/06; B01J 20/20; B01J 20/26; B01J 20/28004; B01J 20/2803; B01J 20/28045; B01J 20/28057; B01J 20/3204
See application file for complete search history.

(56) References Cited

U.S. PATENT DOCUMENTS

| | | | |
|---|---|---|---|
| 5,948,726 A * | 9/1999 | Moskovitz | B01J 37/344 502/247 |
| 6,194,079 B1 * | 2/2001 | Hekal | C08L 69/00 53/111 R |
| 6,200,542 B1 | 3/2001 | Poles et al. | |
| 6,214,303 B1 | 4/2001 | Hoke et al. | |
| 6,340,066 B1 | 1/2002 | Dettling et al. | |
| 6,517,899 B1 | 2/2003 | Hoke et al. | |
| 6,818,254 B1 | 11/2004 | Hoke et al. | |
| 2001/0021363 A1 | 9/2001 | Poles et al. | |
| 2001/0031693 A1 | 10/2001 | Hoke et al. | |
| 2002/0018742 A1 | 2/2002 | Hoke et al. | |
| 2002/0074174 A1 | 6/2002 | Dettling et al. | |
| 2003/0166466 A1 | 9/2003 | Hoke et al. | |
| 2004/0226440 A1 | 11/2004 | Foong et al. | |
| 2005/0100492 A1 | 5/2005 | Hoke et al. | |
| 2009/0031898 A1 | 2/2009 | Foong et al. | |
| 2019/0232254 A1 * | 8/2019 | Weinberger | B01J 35/1047 |
| 2021/0404678 A1 * | 12/2021 | Tanaka | F24F 8/20 |

FOREIGN PATENT DOCUMENTS

| | | |
|---|---|---|
| EP | 0804276 A1 * | 1/1996 |
| JP | 6-53873 B2 | 7/1994 |
| JP | 11-507289 A | 6/1999 |
| JP | 2007-526961 A | 9/2007 |
| JP | 2013-104030 A | 5/2013 |
| JP | 2014-069118 A | 4/2014 |
| JP | 2015-134318 A | 7/2015 |
| JP | 2017-74309 A | 4/2017 |
| WO | 2016/152645 A1 | 9/2016 |

(Continued)

OTHER PUBLICATIONS

Translation of WO2016/167172 (Year: 2016).*
International Search Report dated Jan. 22, 2019, issued in counterpart International Application No. PCT/JP2018/040064 (2 pages).
Extended (Supplementary) European Search Report dated Jul. 20, 2021, issued in counterpart EP application No. 18875631.6. (8 pages).

(Continued)

*Primary Examiner* — Christopher P Jones
(74) *Attorney, Agent, or Firm* — WHDA, LLP

(57) ABSTRACT

It is an object of the present invention to provide a filter which remove acidic gas in the atmosphere with high efficiency and has excellent water resistance. A filter comprising: an aluminium substrate; and an adsorption layer on a surface of the aluminium substrate, wherein the adsorption layer contains activated carbon, a manganese oxide, and an acrylic resin having a pH of 3.0 to 6.5.

4 Claims, No Drawings

(56) References Cited

FOREIGN PATENT DOCUMENTS

WO 2016/167172 A1 10/2016

OTHER PUBLICATIONS

Office Action dated Jul. 5, 2022, issued in counterpart JP application No. 2019-552726, with English Translation. (12 pages).
Office Action dated Aug. 1, 2022, issued in counterpart CN Application No. 201880072189.1, with English translation. (13 pages).

* cited by examiner

FILTER

TECHNICAL FIELD

The present invention relates to a filter that can remove acidic gas in the atmosphere with high efficiency and has excellent water resistance.

BACKGROUND ART

An acidic gas removal method utilizing the adsorption effect of activated carbon is known as a method for removing harmful gas (acidic gas, ozone, volatile organic compounds (VOC), and the like) in the atmosphere. For example, the applicant of the present invention proposes an acidic gas adsorption/removal filter in which a mixture of one or more compounds selected from the group consisting of a hydroxide, a carbonate, and a hydrogen carbonate that contain an alkali metal, activated carbon, and a manganese oxide are carried on a sheet substrate made of an organic fiber material (Patent Literature 1). Also, the applicant of the present invention proposes an acidic gas adsorption/removal filter in which a mixture of one or more compounds selected from the group consisting of a hydroxide, a carbonate, and a hydrogen carbonate that contain an alkali metal, activated carbon, and a manganese oxide are carried on a sheet substrate with a binder resin (polyvinyl pyrrolidone) (Patent Literature 2).

CITATION LIST

Patent Literature

[PTL 1] Japanese Laid-Open Patent Publication No. 2017-74309
[PTL 2] Japanese Laid-Open Patent Publication No. 2015-134318

SUMMARY OF THE INVENTION

Problems to be Solved by the Invention

Sufficient strength may not be obtained with a filter in which a sheet made of an organic fiber material is used as a substrate as described in Patent Literature 1. In order to increase the strength of the filter, an aluminium substrate instead of the sheet made of an organic fiber material may be used as the sheet in the filter described in Patent Literature 1. However, water resistance deteriorates when an aluminium substrate is used. Meanwhile, also in Patent Literature 2, water resistance of the filter deteriorates when an aluminium substrate is used as the sheet substrate.

Solution to the Problems

The present inventors have conducted earnest studies and found that the above-described problem is overcome when, even if an aluminium substrate is used as a substrate, an adsorption layer containing activated carbon, a manganese oxide, and an acrylic resin having a pH of 3.0 to 6.5 are provided on a surface of the aluminium substrate, and have completed the present invention.

That is, a filter comprising: an aluminium substrate; and an adsorption layer on a surface of the aluminium substrate, wherein the adsorption layer contains activated carbon, a manganese oxide, and an acrylic resin having a pH of 3.0 to 6.5.

It is preferable that the activated carbon and the manganese oxide are carried on the surface of the aluminium substrate through the acrylic resin.

It is preferable that the adsorption layer further contains one or more compounds selected from the group consisting of a hydroxide, a carbonate, and a hydrogen carbonate that contain an alkali metal.

It is preferable that the aluminium substrate is a honeycomb structure.

Effect of the Invention

Acidic gas in the atmosphere can be removed with high efficiency by using the filter of the present invention. Also, the filter of the present invention has excellent water resistance, and therefore, can be used in a variety of ways.

DESCRIPTION OF EMBODIMENTS

A filter of the present invention includes an aluminium substrate and an adsorption layer on a surface of the aluminium substrate. Acidic gas in the atmosphere can be removed with high efficiency by using the filter of the present invention. Examples of the acidic gas include: nitrogen oxides such as nitrogen monoxide and nitrogen dioxide; sulfur oxides such as sulfur dioxide; hydrogen halides such as hydrogen chloride and hydrogen fluoride; and hydrogen sulfide.

<Aluminium Substrate>

The aluminium substrate is made of aluminium or an aluminium alloy. The shape of the aluminium substrate is not particularly limited and may be a plate-like shape or may have a honeycomb structure. However, a honeycomb structure is preferred. In other words, the filter of the present invention is preferably a honeycomb filter. In the description herein, the honeycomb filter refers to a filter including an adsorption layer on the surface of the aluminium substrate that is a honeycomb structure. The number of cells in the honeycomb filter is not particularly limited and may be, for example, 50 to 1500 cells/inch$^2$.

The thickness of the aluminium substrate is preferably 0.005 to 0.5 mm, and more preferably 0.01 to 0.1 mm. When the thickness of the aluminium substrate is within the above-described ranges, even if the aluminium substrate is used for the honeycomb filter, the strength is sufficient and pressure loss is less likely to occur.

<Adsorption Layer>

The adsorption layer contains activated carbon, a manganese oxide, and an acrylic resin having a pH of 3.0 to 6.5 (hereinafter, referred to as a low pH acrylic resin). Preferably, the activated carbon and the manganese oxide are carried on the surface of the aluminium substrate through the acrylic resin. Preferably, the adsorption layer further contains one or more compounds (hereinafter, referred to as alkali metal compounds) selected from the group consisting of a hydroxide, a carbonate, and a hydrogen carbonate that contain an alkali metal.

(Activated Carbon)

Activated carbon can be obtained by carbonizing or infusibilizing a carbon material and then activating the obtained carbon material. Examples of the carbon material include graphite, mineral-based materials (coal-based materials such as lignite and bituminous coal, petroleum or petroleum pitch, and the like), plant-based materials (wood, fruit shells (coconut shell and the like), and the like), and polymer-based materials (polyacrylonitrile, phenol-based materials, cellulose, and the like). Among them, a coconut shell is preferable. Activated carbon made from coconut shells (coconut shell activated carbon) is porous, and the coconut shell activated carbon has a higher proportion of small pores compared to a common porous inorganic material such as silica. Also, ash contents (impurities) including Na, Si, K, Ca, Fe, and the like are small in the coconut shell activated carbon. In other words, intermolecular forces act between adsorbed acidic gas components and pore walls because the pores in coconut shell activated carbon are small in size, and the adsorbed acidic gas components are less likely to be released.

The method for carbonizing, infusibilizing, and activating the carbon material is not particularly limited, and a known processing method can be used. Examples of the activation method include: a gas activation method in which the carbon material is subjected to carbonization or infusibilization and heat-treated in water or an activation gas such as carbon dioxide at about 500 to 1000° C.; and a chemical activation method in which the carbon material is subjected to carbonization or infusibilization, mixed with an activator such as phosphate, zinc chloride, or potassium hydroxide, and heat-treated at about 300 to 800° C.

The BET specific surface area of the activated carbon is preferably 500 to 3000 $m^2/g$, more preferably 1000 to 2500 $m^2/g$, and even more preferably 1500 to 2000 $m^2/g$. When the BET specific surface area of the activated carbon is within the above-described ranges, sufficient acidic gas removal performance can be exhibited.

The average particle size of the activated carbon is preferably 1 to 50 μm, more preferably 2 to 30 μm, and even more preferably 5 to 15 μm. When the average particle size is within the above-described ranges, activated carbon particles are less likely to aggregate in a slurry, and the detachment of the activated carbon due to an external force is less likely to occur. The average particle size of the activated carbon refers to a weight median diameter.

The content of the activated carbon in the adsorption layer is preferably 5 to 35 mass %, and more preferably 10 to 25 mass %. When the content of the activated carbon is in the above-described ranges, sufficient acidic gas removal performance can be exhibited.

(Manganese Oxide)

The manganese oxide is not particularly limited. Manganese (II) oxide (MnO), manganese (III) oxide (dimanganese trioxide, $Mn_2O_3$), manganese (IV) oxide (manganese dioxide, $MnO_2$), manganese (II, III) oxide (trimanganese tetraoxide, $Mn_3O_4$), and the like can be used. However, manganese dioxide is preferable.

The BET specific surface area of the manganese oxide used in the present invention is preferably 50 to 400 $m^2/g$, and more preferably 100 to 300 $m^2/g$. When the BET specific surface area of the manganese oxide is in the above-described ranges, sufficient acidic gas removal performance can be exhibited.

The content of the manganese oxide in the adsorption layer is more preferably 50 to 85 mass %, and even more preferably 60 to 75 mass %. When the content of the manganese oxide is within the above-described ranges, sufficient acidic gas removal performance can be exhibited.

(Low pH Acrylic Resin)

Both high acidic gas removal performance and high water resistance can be achieved by using, in the adsorption layer, a low pH acrylic resin having a pH of 3.0 to 6.5. When the pH is lower than 3.0, acidic gas removal performance deteriorates. When the pH is higher than 6.5, an affinity for the aluminium substrate is reduced and water resistance deteriorates.

The pH can be adjusted by neutralizing an acidic group such as a carboxyl group in the acrylic resin with a neutralizer. The neutralizer is not particularly limited as long as the neutralizer can neutralize an acidic group. Examples of the neutralizer include sodium hydroxide, potassium hydroxide, trimethylamine, 2-(dimethylamino)ethanol, 2-amino-2-methyl-1-propanol, triethyl amine, and aqueous ammonia. The pH of the acrylic resin can be adjusted to 3.0 to 6.5 by properly using these neutralizers as necessary. In the description herein, the pH of the acrylic resin refers to a pH of an acrylic resin emulsion. A silicone acrylic resin used in Patent Literature 1 has a pH of 8 or more.

The solid content of the low pH acrylic resin (hereinafter, referred to as low pH acrylic resin (solid content)) in the adsorption layer by percentage is preferably 3 to 20 mass %, and more preferably 5 to 10 mass %. When the content percentage of the low pH acrylic resin is within the above-described ranges, sufficient acidic gas removal performance can be exhibited while water resistance of the filter is maintained.

(Alkali Metal Compound)

The alkali metal compound may be one or more compounds selected from the group consisting of a hydroxide, a carbonate, and a hydrogen carbonate that contain an alkali metal. Examples of the hydroxide that contains an alkali metal include NaOH and KOH. Examples of the carbonate that contains an alkali metal include $Na_2CO_3$ and $K_2CO_3$. Examples of the hydrogen carbonate that contains an alkali metal include $NaHCO_3$ and $KHCO_3$. When the adsorption layer contains the alkali metal compound, acidic gas removal performance can be further enhanced. The alkali metal compound can be used individually, or in combination of two or more types. Among them, a carbonate that contains an alkali metal is preferable, and $K_2CO_3$ is more preferable.

The content of the alkali metal compound is preferably not greater than 30 parts by mass, more preferably 1 to 30 parts by mass, even more preferably 3 to 25 parts by mass, and especially preferably 5 to 15 parts by mass per 100 parts by mass of the activated carbon. When the content of the alkali metal compound is within the above-described ranges, sufficient acidic gas removal performance can be exhibited. When two or more of the alkali metal compounds are used, "the content of the alkali metal compound" refers to the total content of all of the alkali metal compounds.

The content of the alkali metal compound is preferably not greater than 10 parts by mass, more preferably 1 to 5 parts by mass, even more preferably 2 to 4 parts by mass, and especially preferably 2 to 3 parts by mass, per 100 parts by mass of the manganese oxide. When the content of the alkali metal compound is within the above-described ranges, sufficient acidic gas removal performance can be exhibited.

(Others)

The adsorption layer is preferably composed only of the activated carbon, the manganese oxide, the low pH acrylic resin, and the alkali metal compound. However, the adsorption layer may contain a substance other than the above-described ones. For example, the adsorption layer may contain zirconium, copper, cobalt, silver, an alkali metal oxide, and an alkaline earth metal oxide. A water-insoluble flame retardant such as aluminium hydroxide and melamine can be added to the adsorption layer to impart flame retardance as necessary. This is because the water-insoluble flame retardant maintains the particle shapes in a slurry, and therefore the deterioration of acidic gas removal performance due to, for example, surface coating is less likely to occur. Also, even if the filter is immersed in water, the flame retardance can be maintained because the water-insoluble flame retardant is not eluted when immersed in water.

The total content of the activated carbon, the manganese oxide, and the low pH acrylic resin (solid content) is preferably not less than 90 mass %, more preferably not less than 93 mass %, and even more preferably not less than 97 mass % of the entire adsorption layer. The total content of the activated carbon, the manganese oxide, the low pH acrylic resin (solid content), and the alkali metal compound is preferably not less than 90 mass %, more preferably not less than 95 mass %, and even more preferably not less than 99 mass % of the entire adsorption layer.

(Amount of Adsorption Layer Attached to Honeycomb Filter)

When the aluminium substrate has a honeycomb structure, an amount of the adsorption layer attached to the honeycomb filter (hereinafter, referred to as attached amount) is preferably 50 to 200 g/L, and more preferably 100 to 150 g/L. When the attached amount is within the above-described ranges, the cells of the honeycomb filter do not clog, and sufficient acidic gas removal performance can be exhibited.

<Production Method>

The method for producing the filter of the present invention is not particularly limited. For example, the filter including the adsorption layer on the surface of the aluminium substrate can be created by creating a slurry containing the activated carbon, the manganese oxide, the low pH acrylic resin, and the like, immersing the aluminium substrate in the slurry, and then drying the substrate. The percentage of the solid content of the slurry is 10 to 50%, and preferably 25 to 50%. When the percentage of the solid content is less than 10%, the activated carbon, the manganese oxide, the low pH acrylic resin, and the like may not be carried sufficiently on the surface of the aluminium substrate. When the percentage of the solid content is higher than 50%, the slurry thickens, the fluidity of the slurry is reduced, and impregnation may not occur. Drying temperature is usually 60 to 200° C., and preferably 100 to 150° C. When the drying temperature is higher than 200° C., degradation of the slurry may occur. When the drying temperature is lower than 60° C., drying time will increase, and therefore, cost will undesirably increase.

Examples of the method for producing the honeycomb filter include a method in which the aluminium substrate is formed into a honeycomb structure, and then the adsorption layer is attached to the surface of the aluminium substrate to obtain the honeycomb filter. The cross-section of the honeycomb structure is not particularly limited as long as circulation of gas is allowed. For example, the cross-section of the honeycomb structure has a hexagonal shape, quadrangular shape, sine wave shape, or roll shape. Preferably, the cross-section of the honeycomb structure has a hexagonal shape from the viewpoint of strength. The honeycomb structure may have a structure in which hollow columnar bodies such as hollow polygonal columns or hollow cylinders are continuously formed.

The filter of the present invention can be widely used indoors, in vehicles, in wallpaper, in furniture, in interior materials, in resin moldings, in electric devices, etc., in order to reduce acidic gas. Particularly, the filter is preferably used in order to remove acidic gas contained in the atmosphere. For example, it is preferred that granular materials are filled in a gas-permeable container such as a box, a bag, and a net, and are left as they are or used with gas being allowed to pass therethough. More preferably, since the filter has a high removal rate, and a problem of desorption of removed acidic gas is less likely to arise, the filter is used under ventilation. Specifically, the filter can be used as, for example, an air filter for purifying air in the interior of vehicles such as automobiles and railway vehicles, a filter used for purifying air in health-oriented housings and apartment houses adaptable to pets, facilities for elderly people, hospitals and offices, and the like, a filter for air conditioners, an intake and exhaust filter for office automation equipment, a filter for air conditioning in buildings, and a filter for industrial clean rooms.

The present application claims the benefit of priority to Japanese Patent Application No. 2017-217558 filed on Nov. 10, 2017. The entire contents of the specifications of Japanese Patent Application No. 2017-217558 filed on Nov. 10, 2017 are hereby incorporated by reference.

EXAMPLES

Hereinafter, the present invention is described in more detail with reference to examples, which however are not intended to limit the present invention, and any modifications within the scope of the present invention are encompassed in the present invention.

Measurement and evaluation methods used in examples are now described.

(Affinity for Aluminium Substrate)

A slurry droplet was dropped on the aluminium substrate, and an angle of contact between the aluminium substrate and the droplet was measured. The slurry will be described below.

(Water resistance evaluation method) A sample (honeycomb filter) was immersed in ion-exchanged water for 24 hours and then taken out from the water. A detached amount [mg] of the adsorption layer was calculated based on the change in the mass between before and after the immersion. The detached amount [mg/cc] of the adsorption layer per 1 cc of the sample was calculated by dividing the detached amount [mg] of the adsorption layer by the volume [cc] of the sample.

(Sulfur Dioxide Removal Performance)

A sample (honeycomb filter) was cut so as to have a diameter of 26 mm and a height of 20 mm, and the cut sample was placed in a glass column having an internal diameter of 26 mm. Air containing 100 ppm of sulfur dioxide gas and having a temperature of 25° C. and a relative humidity of 50% was circulated at a flow rate of 2.0 L/min. The temperature in the glass column was maintained constant at 25° C. Changes in sulfur dioxide gas concentration at the inlet and the outlet of the glass column were continuously measured with a photoacoustic gas monitor 1312 (manufactured by INNOVA) from the start of the measurement up to elapse of one hour. A sulfur dioxide gas removal amount [mg] in one hour was calculated by numerically integrating the changes in sulfur dioxide gas concentration. A sulfur dioxide gas removal amount [mg/cc] per 1 cc of the sample was calculated by dividing the sulfur dioxide gas removal amount [mg] by the volume [cc] of the sample having been cut.

(pH of Acrylic Resin)

A pH of the acrylic resin emulsion was measured with a pH meter manufactured by HORIBA, Ltd.

Example 1

A slurry was prepared by 350 g of coconut shell activated carbon (BET specific surface area: 1800 m$^2$/g, particle size: 13 μm), 1300 g of manganese dioxide (BET specific surface area: 200 m$^2$/g), and 325 g of acrylic resin emulsion having a pH of 3 (solid content in the acrylic resin: 30 mass %) being added to 2300 g of ion-exchanged water, stirred all night, and sufficiently dispersed. Subsequently, a honeycomb structure (cross-section: hexagonal shape, 850 cells/inch$^2$) in which aluminium foil with a thickness of 0.015 mm was used as a substrate, was immersed in the slurry. After sufficient penetration of the slurry into the interior of the honeycomb structure was confirmed, the honeycomb structure was taken out. Excess slurry was blown off from the honeycomb structure by air blowing, and the honeycomb structure was then dried in a dryer at 120° C. for 3 hours to obtain a honeycomb filter having the adsorption layer on the surface of the honeycomb structure. An attached amount of the adsorption layer in the honeycomb filter was calculated from the mass of the honeycomb filter in which the adsorption layer was not attached yet and the mass of the honeycomb filter having the adsorption layer attached thereto. As a result, the attached amount was 130 g/L.

Example 2

A honeycomb filter was obtained by a method similar to that used in Example 1 except an acrylic resin emulsion having a pH of 6 was used. An attached amount of the adsorption layer in the honeycomb filter was 130 g/L.

Example 3

A honeycomb filter was obtained by a method similar to that used in Example 1 except an acrylic resin emulsion having a pH of 6 was used, and 40 g of potassium carbonate was further added to ion-exchanged water. An attached amount of the adsorption layer in the honeycomb filter was 133 g/L.

Comparative Example 1

A honeycomb filter was obtained by a method similar to that used in Example 1 except an acrylic resin emulsion having a pH of 2 was used. An attached amount of the adsorption layer in the honeycomb filter was 130 g/L.

Comparative Example 2

A honeycomb filter was obtained by a method similar to that used in Example 1 except an acrylic resin emulsion having a pH of 10 was used. An attached amount of the adsorption layer in the honeycomb filter was 130 g/L.

Comparative Example 31

A honeycomb filter was obtained by a method similar to that used in Example 1 except an acrylic resin emulsion having a pH of 10 was used, and 40 g of potassium carbonate was further added to ion-exchanged water. An attached amount of the adsorption layer in the honeycomb filter was 133 g/L.

Structures and various physical properties of Examples and Comparative Examples are shown in table 1. The filter in each of Examples 1 to 3 had high affinity between the aluminium substrate and the slurry for producing the adsorption layer, had excellent water resistance, and were capable of removing sulfur dioxide gas with high efficiency. In the filters in Examples 1 to 3, the coconut shell activated carbon and the manganese dioxide were carried on the surface of the aluminium substrate through the acrylic resin. On the other hand, the filter in Comparative Example 1 did not remove sulfur dioxide gas sufficiently because the pH of the acrylic resin was too low. The filter in each of Comparative Examples 2 and 3 had insufficient water resistance because the pH of the acrylic resin was too high, and therefore, the affinity between the aluminium substrate and the slurry for producing the adsorption layer became low.

TABLE 1

| Item | | Example 1 | Example 2 | Example 3 | Comparative Example 1 | Comparative Example 2 | Comparative Example 3 |
|---|---|---|---|---|---|---|---|
| pH of acrylic resin | | 3 | 6 | 6 | 2 | 10 | 10 |
| Contact angle of slurry [°] | | 43 | 46 | 45 | 42 | 84 | 85 |
| Honeycomb filter | Detached amount [mg/cc] | 3.4 | 3.7 | 3.6 | 3.3 | 13.3 | 14.4 |
| | Sulfur dioxide gas removal amount [mg/cc] | 7.5 | 9.2 | 10.2 | 4.4 | 9.4 | 9.9 |

The invention claimed is:

1. A filter comprising:
an aluminium substrate; and
an adsorption layer on a surface of the aluminium substrate, wherein
the adsorption layer consists of activated carbon, a manganese oxide, and an acrylic resin having a pH of 3.0 to 6.5, and
a BET specific surface area of the activated carbon is 1800 to 3000 m$^2$/g.

2. The filter according to claim 1, wherein
the activated carbon and the manganese oxide are carried on the surface of the aluminium substrate through the acrylic resin.

3. The filter according to claim 1, wherein
the aluminium substrate is a honeycomb structure.

4. The filter according to claim 2, wherein
the aluminium substrate is a honeycomb structure.

* * * * *